US008493822B2

(12) United States Patent
Lee et al.

(10) Patent No.: US 8,493,822 B2
(45) Date of Patent: Jul. 23, 2013

(54) METHODS, SYSTEMS, AND PROGRAM PRODUCTS FOR CONTROLLING THE PLAYBACK OF MUSIC

(75) Inventors: Alan Russell Lee, Montara, CA (US); Andrew Leonard Axelrod, West Linn, OR (US)

(73) Assignee: adidas AG, Herzogenaurach (DE)

( * ) Notice: Subject to any disclaimer, the term of this patent is extended or adjusted under 35 U.S.C. 154(b) by 371 days.

(21) Appl. No.: 12/836,401

(22) Filed: Jul. 14, 2010

(65) Prior Publication Data

US 2012/0014233 A1   Jan. 19, 2012

(51) Int. Cl.
*G11B 21/08* (2006.01)

(52) U.S. Cl.
USPC .................................. 369/30.09; 700/94

(58) Field of Classification Search
USPC ............................ 369/30.05–30.19; 700/94
See application file for complete search history.

(56) References Cited

U.S. PATENT DOCUMENTS

| 4,571,680 | A | 2/1986 | Wu |
| 4,674,743 | A | 6/1987 | Hirano |
| 4,776,323 | A | 10/1988 | Spector |
| 4,788,983 | A | 12/1988 | Brink et al. |
| 4,911,005 | A | 3/1990 | Heyn et al. |
| 5,137,501 | A | 8/1992 | Mertesdorf |
| 5,148,002 | A | 9/1992 | Kuo et al. |
| 5,215,468 | A | 6/1993 | Lauffer et al. |
| 5,267,942 | A | 12/1993 | Saperston |
| 5,314,389 | A | 5/1994 | Dotan |
| 5,430,435 | A | 7/1995 | Hoch et al. |
| 5,470,233 | A | 11/1995 | Fruchterman et al. |
| 5,492,514 | A | 2/1996 | Daum |
| 5,592,401 | A | 1/1997 | Kramer |
| 5,702,323 | A | 12/1997 | Poulton |
| 5,728,027 | A | 3/1998 | Sinaiko |
| 5,757,929 | A | 5/1998 | Wang et al. |
| 5,767,795 | A | 6/1998 | Schaphorst |
| 5,825,327 | A | 10/1998 | Krasner |
| 5,857,939 | A | 1/1999 | Kaufman |
| 5,891,042 | A | 4/1999 | Sham et al. |
| 5,919,239 | A | 7/1999 | Fraker et al. |

(Continued)

FOREIGN PATENT DOCUMENTS

| EP | 1128358 | | 8/2001 |
| EP | 1251441 | A2 | 10/2002 |

(Continued)

OTHER PUBLICATIONS

Garmin International, Inc., NAVTALK, Cellular Phone/GPS Receiver, Owner's Manual and Reference Guide, 1999-2000, Garmin Corporation, 64 pages.

(Continued)

*Primary Examiner* — Tan X Dinh
(74) *Attorney, Agent, or Firm* — Sterne, Kessler, Goldstein & Fox PLLC

(57) ABSTRACT

Methods, systems, and program products for controlling the playback of music are disclosed. In an embodiment a method for controlling the playback of music includes the steps of: initiating the playback of a first music track; stopping the playback of the first music track; initiating the playback of alternative audio content; stopping the playback of the alternative content; and determining whether to initiate the playback of the first music track or to initiate the playback of a second music track.

38 Claims, 6 Drawing Sheets

U.S. PATENT DOCUMENTS

| | | |
|---|---|---|
| 5,948,040 A | 9/1999 | DeLorme et al. |
| 5,976,083 A | 11/1999 | Richardson et al. |
| 5,986,200 A | 11/1999 | Curtin |
| 6,002,982 A | 12/1999 | Fry |
| 6,011,760 A * | 1/2000 | Fleming, III ............... 369/30.28 |
| 6,013,007 A | 1/2000 | Root et al. |
| 6,046,689 A | 4/2000 | Newman |
| 6,059,576 A | 5/2000 | Brann |
| 6,067,279 A * | 5/2000 | Fleming, III ............... 369/30.06 |
| 6,080,110 A | 6/2000 | Thorgersen |
| 6,135,951 A | 10/2000 | Richardson et al. |
| 6,148,262 A | 11/2000 | Fry |
| 6,175,537 B1 * | 1/2001 | Fleming, III ............... 369/30.06 |
| 6,230,047 B1 | 5/2001 | McHugh |
| 6,251,048 B1 | 6/2001 | Kaufman |
| 6,345,197 B1 | 2/2002 | Fabrizio |
| 6,442,479 B1 | 8/2002 | Barton |
| 6,446,080 B1 | 9/2002 | Van Ryzin et al. |
| 6,463,385 B1 | 10/2002 | Fry |
| 6,477,542 B1 | 11/2002 | Papaioannou |
| 6,487,145 B1 * | 11/2002 | Berhan ...................... 369/30.15 |
| 6,513,532 B2 | 2/2003 | Mault et al. |
| 6,563,770 B1 * | 5/2003 | Kokhab ...................... 369/30.08 |
| 6,582,342 B2 | 6/2003 | Kaufman |
| 6,585,622 B1 | 7/2003 | Shum et al. |
| 6,587,403 B1 * | 7/2003 | Keller et al. ............... 369/30.06 |
| 6,607,493 B2 | 8/2003 | Song |
| 6,623,427 B2 | 9/2003 | Mandigo |
| 6,716,139 B1 | 4/2004 | Hosseinzadeh-Dolkhani et al. |
| 6,717,891 B2 * | 4/2004 | Negishi ...................... 369/30.11 |
| 6,736,759 B1 | 5/2004 | Stubbs et al. |
| 6,746,247 B2 | 6/2004 | Barton |
| 6,753,882 B2 | 6/2004 | Nakazawa et al. |
| 6,798,378 B1 | 9/2004 | Walters |
| 6,808,473 B2 | 10/2004 | Hisano et al. |
| 6,823,036 B1 | 11/2004 | Chen |
| 6,837,827 B1 | 1/2005 | Lee et al. |
| 6,845,321 B1 | 1/2005 | Kerns |
| 6,853,955 B1 | 2/2005 | Burrell et al. |
| 6,872,077 B2 | 3/2005 | Yeager |
| 6,882,955 B1 | 4/2005 | Ohlenbusch et al. |
| 6,947,728 B2 | 9/2005 | Tagawa et al. |
| 7,003,122 B2 | 2/2006 | Chen |
| 7,062,225 B2 | 6/2006 | White |
| 7,065,007 B2 * | 6/2006 | Zimmermann et al. ... 369/30.12 |
| 7,072,789 B2 | 7/2006 | Vock et al. |
| 7,085,678 B1 | 8/2006 | Burrell et al. |
| 7,108,659 B2 | 9/2006 | Ross et al. |
| 7,123,936 B1 | 10/2006 | Rydbeck et al. |
| 7,142,482 B2 * | 11/2006 | Ito ............................... 369/30.09 |
| 7,220,220 B2 | 5/2007 | Stubbs et al. |
| 7,229,385 B2 | 6/2007 | Freeman et al. |
| 7,251,454 B2 | 7/2007 | White |
| 7,254,368 B1 | 8/2007 | Okada et al. |
| 7,254,516 B2 | 8/2007 | Case, Jr. et al. |
| 7,292,867 B2 | 11/2007 | Werner et al. |
| 7,353,139 B1 | 4/2008 | Burrell et al. |
| 7,354,380 B2 | 4/2008 | Volpe, Jr. |
| 7,398,151 B1 | 7/2008 | Burrell et al. |
| 7,457,724 B2 | 11/2008 | Vock et al. |
| 7,480,512 B2 | 1/2009 | Graham et al. |
| 7,518,054 B2 | 4/2009 | McKinney et al. |
| 7,519,327 B2 | 4/2009 | White |
| 7,537,546 B2 | 5/2009 | Watterson et al. |
| 7,579,946 B2 | 8/2009 | Case, Jr. |
| 7,603,255 B2 | 10/2009 | Case, Jr. et al. |
| 7,607,243 B2 | 10/2009 | Berner, Jr. et al. |
| 7,643,895 B2 | 1/2010 | Gupta et al. |
| 7,648,463 B1 | 1/2010 | Elhag et al. |
| 7,670,263 B2 | 3/2010 | Ellis et al. |
| 7,706,815 B2 | 4/2010 | Graham et al. |
| 7,766,794 B2 | 8/2010 | Oliver et al. |
| 7,771,320 B2 | 8/2010 | Riley et al. |
| 7,805,149 B2 | 9/2010 | Werner et al. |
| 7,805,150 B2 | 9/2010 | Graham et al. |
| 8,105,208 B2 | 1/2012 | Oleson et al. |
| 8,112,226 B2 | 2/2012 | Soehren |
| 2001/0003542 A1 | 6/2001 | Kita |
| 2002/0049535 A1 | 4/2002 | Rigo et al. |
| 2002/0094776 A1 | 7/2002 | Pulver |
| 2002/0102988 A1 | 8/2002 | Myllymaki |
| 2002/0107433 A1 | 8/2002 | Mault |
| 2003/0100315 A1 | 5/2003 | Rankin |
| 2003/0139254 A1 | 7/2003 | Chang |
| 2003/0171189 A1 | 9/2003 | Kaufman |
| 2003/0191578 A1 | 10/2003 | Paulauskas et al. |
| 2003/0216228 A1 | 11/2003 | Rast |
| 2003/0224337 A1 | 12/2003 | Shum et al. |
| 2003/0229446 A1 | 12/2003 | Boscamp et al. |
| 2004/0046692 A1 | 3/2004 | Robson et al. |
| 2004/0102931 A1 | 5/2004 | Ellis et al. |
| 2004/0116784 A1 | 6/2004 | Gavish |
| 2004/0199056 A1 | 10/2004 | Husemann et al. |
| 2004/0203789 A1 | 10/2004 | Hammond et al. |
| 2004/0203873 A1 | 10/2004 | Gray |
| 2004/0223417 A1 * | 11/2004 | Bardsley et al. ........... 369/30.09 |
| 2005/0049113 A1 | 3/2005 | Yueh et al. |
| 2005/0096933 A1 | 5/2005 | Collins, III et al. |
| 2005/0124463 A1 | 6/2005 | Yeo et al. |
| 2005/0172311 A1 | 8/2005 | Hjelt et al. |
| 2005/0192025 A1 | 9/2005 | Kaplan |
| 2005/0195094 A1 | 9/2005 | White |
| 2005/0197063 A1 | 9/2005 | White |
| 2005/0266961 A1 | 12/2005 | Shum et al. |
| 2005/0287499 A1 | 12/2005 | Yeager |
| 2006/0025282 A1 | 2/2006 | Redmann |
| 2006/0136173 A1 | 6/2006 | Case, Jr. et al. |
| 2006/0156356 A1 | 7/2006 | Sato et al. |
| 2006/0169125 A1 | 8/2006 | Ashkenazi et al. |
| 2006/0189360 A1 | 8/2006 | White |
| 2006/0203972 A1 | 9/2006 | Hays |
| 2006/0240865 A1 | 10/2006 | White |
| 2006/0253210 A1 | 11/2006 | Rosenberg |
| 2007/0006489 A1 | 1/2007 | Case, Jr. et al. |
| 2007/0011919 A1 | 1/2007 | Case, Jr. |
| 2007/0018952 A1 | 1/2007 | Arseneau et al. |
| 2007/0021269 A1 | 1/2007 | Shum |
| 2007/0260421 A1 | 11/2007 | Berner, Jr. et al. |
| 2008/0002528 A1 | 1/2008 | Andren et al. |
| 2008/0009275 A1 | 1/2008 | Werner et al. |
| 2008/0051993 A1 | 2/2008 | Graham et al. |
| 2008/0058971 A1 | 3/2008 | Graham et al. |
| 2008/0059064 A1 | 3/2008 | Werner et al. |
| 2008/0065319 A1 | 3/2008 | Graham et al. |
| 2008/0096726 A1 | 4/2008 | Riley et al. |
| 2008/0101161 A1 | 5/2008 | Imai et al. |
| 2008/0103689 A1 | 5/2008 | Graham et al. |
| 2008/0200154 A1 | 8/2008 | Maharajh et al. |
| 2008/0200310 A1 | 8/2008 | Tagliabue |
| 2008/0201639 A1 | 8/2008 | Shoman |
| 2008/0207115 A1 | 8/2008 | Lee et al. |
| 2008/0319661 A1 | 12/2008 | Werner et al. |
| 2009/0047645 A1 | 2/2009 | Dibenedetto et al. |
| 2009/0048044 A1 | 2/2009 | Oleson et al. |
| 2009/0048070 A1 | 2/2009 | Vincent et al. |
| 2009/0144080 A1 | 6/2009 | Gray et al. |
| 2009/0233770 A1 | 9/2009 | Vincent et al. |
| 2009/0262088 A1 | 10/2009 | Moll-Carrillo et al. |
| 2010/0042427 A1 | 2/2010 | Graham et al. |
| 2010/0062740 A1 | 3/2010 | Ellis et al. |
| 2010/0075806 A1 | 3/2010 | Montgomery |
| 2010/0082136 A1 | 4/2010 | Rosenblatt et al. |
| 2010/0088023 A1 | 4/2010 | Werner |
| 2010/0292050 A1 | 11/2010 | DiBenedetto et al. |
| 2010/0292599 A1 | 11/2010 | Oleson et al. |
| 2010/0292600 A1 | 11/2010 | DiBenedetto et al. |
| 2012/0140605 A1 * | 6/2012 | Scherf et al. ............... 369/30.08 |

FOREIGN PATENT DOCUMENTS

| | | |
|---|---|---|
| WO | WO 02/067449 A2 | 8/2002 |
| WO | WO 2008/101168 A2 | 8/2008 |
| WO | WO 2009/033034 A1 | 3/2009 |

OTHER PUBLICATIONS

Garmin Ltd, NAVTALK, Product information, 2002, 6 pages.

GPSII, Garmin Owner's Manual & Reference, 54 pages, Aug. 1996, Garmin Corp., Kansas, USA.

GPSIII, Garmin Owner's Manual & Reference, 50 pages, Aug. 1997, Garmin Corp., Kansas, USA.

Magellan GPS, NAVDLX-10 User Guide, 91 pages, Magellan Systems Corp., 1995.

Magellen GPS Satellite Navigator Reference Guide Trailblazer XL, 78 pages, Magellan Systems Corp., 1995.

Mehaffey et al., Garmin's NAVTALK Cell Phone and Road Map GPS Product Review, Revision 2, Nov. 2, 1999, 5 pages.

Richtel, "Surfing for Music," Popular Science, 7 pages, Sep. 1999, pp. 70-74.

RIO PMP300 User's Guide, 28 pages, 1998, Diamond Multimedia Systems, Inc., San Jose, CA, USA.

Sawhney et al., "Speaking and Listening on the Run: Design for Wearable Audio Computing," Speech Interface Group, MIT Media Laboratory, Oct. 19-20, 1988, Pittsburgh, PA, 11 pages.

Tucker et al., "A Microprocessor-Based Fitness Monitor With Analog Voice Feedback For Runners". 1991 IEEE Case Studies in Medical Instrument Design, 12 pages, 1991:163-170.

GPSII, Garmin Owner's Manual & Reference, 108 pages, Aug. 1996, Garmin Corp., Kansas, USA.

GPSIII, Garmin Owner's Manual & Reference, 100 pages, Aug. 1997, Garmin Corp., Kansas, USA.

Garmin International, Inc., "NAVTALK; Cellular Phone/GPS Receiver; Owner's Manual and Reference Guide," 1999-2000, Garmin Corporation, 128 pages.

* cited by examiner

METHODS, SYSTEMS, AND PROGRAM PRODUCTS FOR CONTROLLING THE PLAYBACK OF MUSIC

CROSS-REFERENCE TO RELATED APPLICATIONS

This application is related to commonly owned U.S. patent application Ser. No. 12/836,421, titled "Fitness Monitoring Methods, Systems, and Program Products, and Applications Thereof," and U.S. patent application Ser. No. 12/836,416, titled "Location-Aware Fitness Monitoring Methods, Systems, and Program Products, and Applications Thereof," filed on the same day herewith, each of which is incorporated herein by reference in its entirety.

FIELD OF THE INVENTION

The present invention generally relates to audio playback. More particularly, the present invention relates to methods, systems, and program products for controlling the playback of music on a device.

BACKGROUND OF THE INVENTION

To many people in many cultures, music is an important part of their everyday lives. Technology has transformed the experience of listening to music, partly through increasing the ease of access to music. A wide variety of stationary and portable consumer electronic devices are capable of providing music playback to a user. Such devices may be capable of playing various forms of music media such as, for example, digital audio files (e.g. MP3 files), audio CDs, audio tapes, and/or radio transmissions (e.g. terrestrial, satellite, and/or internet radio transmissions).

The ongoing convergence of various media, information, and telecommunications technologies has led to single consumer electronic devices that are capable of playing more than one form of music media, as well as single devices that are capable of providing a user with other features in addition to music playback. Such other features may include, for example, telephone, email, text message, calendar, camera, video, and/or web browsing features. While enabling multiple forms of music playback and/or providing additional functionalities in a single device may increase device versatility, seamlessly integrating all of these technologies to allow for an optimal user experience with the device may be problematic.

Certain devices may provide a plurality of audio channels for different audio sources. Other devices may need to rely on only a single audio channel to handle, for example, separate music and voice signals. In these single channel devices, the music and audio signals may not be capable of being transmitted at the same time. Managing the transmission of different audio source signals in a device with only a single audio channel may thus be problematic.

What is needed are improved methods, systems, and program products for controlling the playback of music that allow for an improved user experience with music playback devices.

BRIEF SUMMARY OF THE INVENTION

The present invention relates to a method for controlling the playback of music including the steps of: (a) initiating the playback of a first music track; (b) stopping the playback of the first music track after step (a); (c) initiating the playback of alternative audio content after step (b); (d) stopping the playback of the alternative content after step (c); and (e) determining whether to initiate the playback of the first music track or to initiate the playback of a second music track after step (d).

The present invention may also relate to a system for controlling the playback of music, including a portable device adapted for the playback of music, wherein the portable device comprises a memory capable of storing a first music track, a second music track, and alternative audio content, and a processor capable of being operable to initiate the playback of the first music track at a first time, stop the playback of the first music track at a second time after the first time, initiate the playback of the alternative audio content at the second time, stop the playback of the alternative content at a third time after the second time, and determine whether to initiate the playback of the first music track or to initiate the playback of the second music track at the third time.

The present invention may further relate to a tangible computer program product comprising a non-transitory computer readable medium having computer program logic recorded thereon for causing at least one processor to initiate the playback of a music track, stop the playback of the music track, initiate the playback of alternative audio content, stop the playback of the alternative content, determine the quantity of unplayed time remaining for the music track, determine X, wherein X is equal to the quantity of time of the alternative audio content, determine that the quantity of unplayed time remaining for the music track is greater than X, and in response to determining that the quantity of unplayed time remaining for the music track is greater than X, initiate the playback of the music track from a point in the music track that occurs after the point in the music track at which playback of the music track stopped.

The present invention may also relate to a tangible computer program product comprising a non-transitory computer readable medium having computer program logic recorded thereon for causing at least one processor to initiate the playback of a first music track, stop the playback of the first music track, initiate the playback of alternative audio content, stop the playback of the alternative content, determine the quantity of unplayed time remaining for the first music track, determine X, wherein X is equal to the quantity of time of the alternative audio content, determine that the quantity of unplayed time remaining for the first music track is less than X, and in response to determining that the quantity of unplayed time remaining for the first music track is less than X, initiate the playback of a second music track from the beginning of the second music track.

Further aspects, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention by way of example, and not by way of limitation, and, together with the description, further serve to explain the principles of the invention and to enable a person skilled in the pertinent art to make and use the invention.

DETAILED DESCRIPTION OF THE INVENTION

The present invention will now be described in detail with reference to embodiments thereof as illustrated in the accompanying drawings. References to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the present invention may utilize a music playback device 100 to control the playback of music. The music playback device 100 may be, for example, a digital audio file player (e.g. an MP3 player), an audio CD player, an audio tape player, a radio receiver (e.g. a terrestrial, satellite, or interne radio receiver), a home audio system, a vehicle audio system, a television, an computer, a mobile phone, or any other stationary or portable device capable of providing music playback to a user 10.

Figure 1:
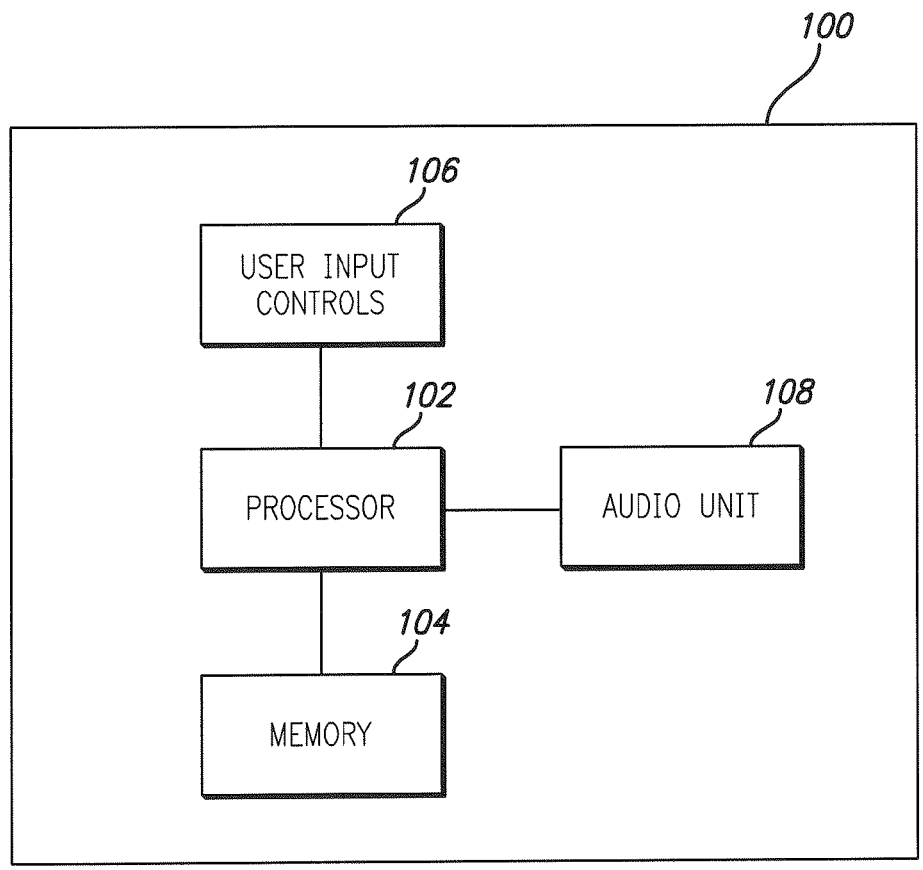
FIG. 1 is a block diagram of components of a music playing device according to an embodiment of the present invention.

FIG. 1 is a block diagram of components of a music playback device 100 according to an embodiment of the present invention. As shown in FIG. 1, the music playback device 100 may include a processor 102, a memory 104, user input controls 106, and an audio unit 108. These components may be operatively connected to carry out the functionality of the music playback device 100, as is described in further detail below. In some embodiments, one or more of these components may be omitted, or additional components may be included. In an embodiment, the music playback device 100 may include a battery. In one embodiment, a speaker and/or an audio output port may also be included. In another embodiment, the speaker and/or the audio output port may be part of the audio unit 108.

The processor 102 of the music playback device 100 may be adapted to implement application programs that are stored in the memory 104, such as those described in further detail below. The processor 102 may be operatively connected to the memory 104, the user input controls 106, and the audio unit 108.

The memory 104 may be adapted to store application programs used to implement aspects of the functionality of the music playback system described herein. The memory 104 may also be adapted to store other data and information, as described in further detail below. For example, the memory 104 may be adapted to store music tracks, a playlist, and/or alternative audio content. In one embodiment, the memory 104 may include read only memory and/or random access memory. In another embodiment, the memory 104 may include a memory card or other removable storage device.

The memory 104 may be operatively connected to the processor 102 and the audio unit 108.

The user input controls 106 may be utilized by the user 10 to interact with the music playback device 100. In an embodiment, user input controls 106 may include one or more physical input buttons, switches, and/or keys. In one embodiment, the user input controls 106 may include a track pad, scroll ball, and/or touch screen input controls (e.g. virtual input buttons, switches, and/or keys). In some embodiments the user input controls 106 may include capacitance switches, while in other embodiments the user input controls 106 may be a microphone for enabling voice-activated controls. The function of each of these user input controls 106 may be determined based on an operating mode of the music playback device 100.

In the embodiment depicted in FIG. 1, the user input controls 106 may be integrally coupled to and included within the same housing as the music playback device 100. However, in an embodiment, as described in further detail below, some or all of the user input controls 106 may not be integrally coupled to and/or included within the same housing as the music playback device 100 itself.

The audio unit 108 may be used to process audio files and/or audio signals. For example, the audio unit 108 may process music tracks, a playlist, and/or alternative audio content. As a further example, the audio unit 108 may convert digital audio signals into amplified analog signals that may be used to drive mono or stereo speakers which may or may not be incorporated into one or more headphones.

A user 10 may utilize a music playback device 100, such as the device 100 depicted in FIG. 1, to control the playback of music. The music may be embodied in one or more forms of music media such as, for example, digital audio files (e.g. MP3 files), audio CDs, audio tapes, and/or radio transmissions (e.g. terrestrial, satellite, and/or internet radio transmissions). In one embodiment, the music may be embodied in an internet radio stream such as those provided by Pandora Media, Inc. of Oakland, Calif.

In an embodiment individual pieces of music may be separated into individual tracks. For example, each track may include data corresponding to a single song. In one embodiment, as described in further detail below, multiple tracks may be associated with a playlist 400.

In addition to listening to the primary music content, some users 10 may also want to listen to alternative audio content. Alternative audio content may be non-musical content such as, for example, artificial speech generated by a speech synthesizer, a voice recording that had previously been saved as an audio track, or a substantially real-time remotely transmitted voice transmission (e.g. a telephone call). Alternative audio content may also be, for example, musical content that differs from the primary musical content (e.g. a music ringtone). Such alternative audio content may convey, for example, a message from a friend, relative, and/or colleague, news or information, an advertisement, point-of-interest information, and/or substantially real-time feedback, as described in further detail below.

Figure 2:
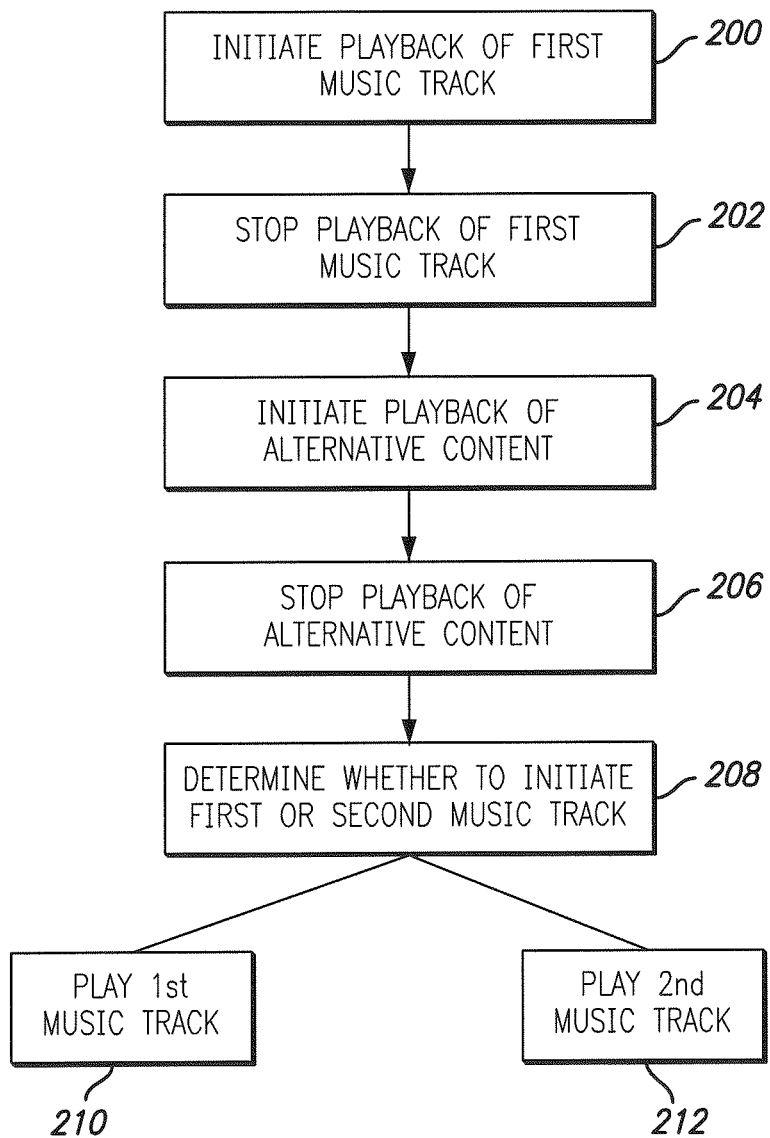
FIG. 2 is a flow chart of a music playback process according to an embodiment of the present invention.

In embodiments of the present invention where the user 10 wants to be able to listen to alternative audio content in addition to the primary music content, the music playback device 100 may be capable of controlling the playback of the music and the alternative content. FIG. 2 is a flow chart of one music playback process according to an embodiment of the present invention.

As illustrated in FIG. 2, at step 200, the processor 102 of the music playback device 100 may initiate the playback of a first music track. At step 202, playback of the first music track may be stopped. Then, at step 204, the processor 102 may initiate the playback of alternative audio content. At step 206, playback of the alternative content may be stopped. Finally, at step 208, the processor 102 may determine whether to next initiate the playback of the first music track (again) or to initiate the playback of a second music track. Initiation of playback of the first music track or the second music track may subsequently occur at steps 210 or 212, respectively. One or more of the preceding steps may occur in response to the processor 102 processing computer program logic of a software application program.

At step 200, playback of a first music track may be initiated. In one embodiment, the identity of the first music track may be determined by reference to a playlist 400 that indicates which music track is to be played first. In an embodiment, playback of the first music track may be initiated from the beginning of the first music track. In one embodiment, playback of the first music track may occur in response to the user 10 interacting with one or more user input controls 106 of the music playback device 100. In other embodiments, playback of the first music track may occur automatically, or as a result of an input from a source other than the user input controls 106.

At step 202, playback of the first music track may be stopped. In an embodiment, stopping of playback of the first music track may occur before the end of the first music track has been reached. In one embodiment, stopping of playback of the first music track may occur in response to the user 10 interacting with one or more user input controls 106 of the music playback device 100. In other embodiments, stopping of playback of the first music track may occur in response to the processor 102 detecting that alternative content is ready to be played, and/or in response to a request for alternative content to be played.

At step 204, the processor 102 may initiate the playback of alternative audio content. In one embodiment playback of the alternative audio content may begin at precisely or approximately the same moment that stopping of playback of the first music track occurs. In another embodiment, there may be a delay between the moment that stopping of playback of the first music track occurs and the moment that playback of the alternative audio content begins. In an embodiment, playback of the alternative audio content may be initiated in response to the user 10 interacting with one or more user input controls 106 of the music playback device 100. In other embodiments, playback of the alternative audio content may be initiated in response to a request for the alternative audio content from the processor 102.

At step 206, playback of the alternative content may be stopped. In an embodiment, stopping of playback of the alternative audio content may occur before the end of the alternative audio content has been reached. In one embodiment, stopping of playback of the alternative audio content may occur in response to the user 10 interacting with one or more user input controls 106 of the music playback device 100. In other embodiments, stopping of playback of the alternative audio content may occur in response to the processor 102 detecting that playback of the alternative content is ready to be stopped, and/or in response to a request for playback of the alternative content to be stopped.

Finally, at step 208, the processor 102 may determine whether to next initiate the playback of the first music track (again) or to initiate the playback of a second music track. Initiation of playback of the first music track or the second music track may subsequently occur at steps 210 or 212, respectively. In an embodiment, the identity of the second music track may be determined by reference to a playlist 400 that indicates which music track is to be played second.

Figure 3:
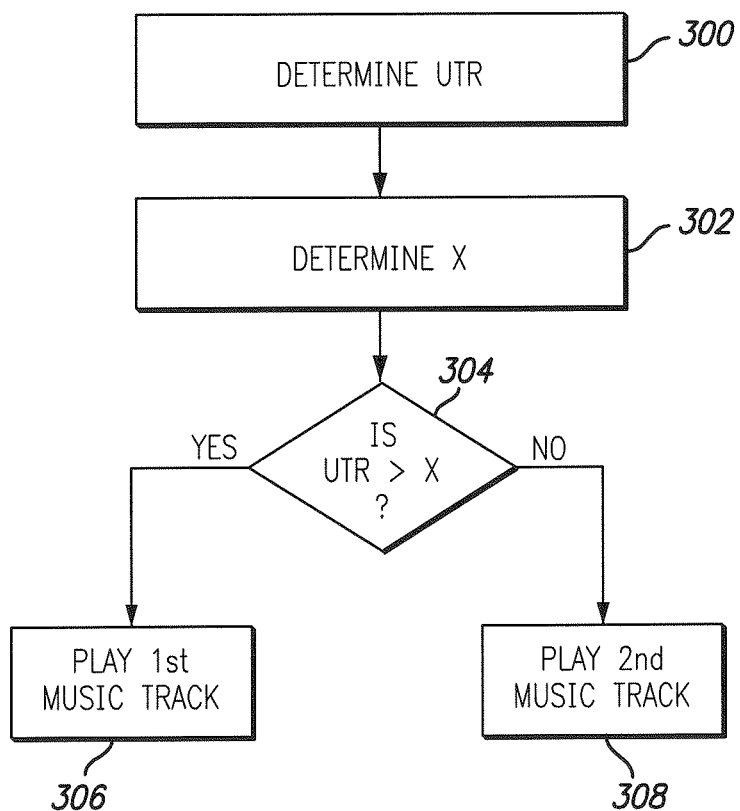
FIG. 3 is a flow chart of a music playback process according to an embodiment of the present invention.

FIG. 3 is a flow chart of another aspect of a music playback process according to an embodiment of the present invention. This portion of the music playback process concerns determining whether to initiate the playback of the first music track (again) or to initiate the playback of a second music track. Thus, according to one embodiment of the present invention, these aspects of the music playback process may supplement or replace steps 208-212 of the music playback process of FIG. 2. One or more of the following steps may occur in response to the processor 102 processing computer program logic of a software application program.

As illustrated in FIG. 3, at step 300, the processor 102 may determine the quantity of the unplayed time remaining (UTR) for the first track. If stopping of playback of the first music track occurs before the end of the first music track has been reached, there will be some UTR for the first track. For example, if the first music track is 4 minutes and 30 seconds long but stopping of playback of the first music track occurred 2 minutes and 30 seconds into the track, the UTR for the first track is 2 minutes.

At step 302, the processor 102 may determine the quantity of time of the alternative audio content (X). In one embodiment, if, for example, the alternative audio content is a voice recording that had previously been saved as an audio track, it may be possible to determine X as soon as the alternative audio content is accessed. For example, the processor 102 may be able to instantly analyze the audio track to determine its predetermined, fixed runtime. However, in another embodiment, if, for example, the alternative audio content is a substantially real-time remotely transmitted voice transmission (e.g. a telephone call), it may not be possible to determine X until the alternative audio content has finished playing. For example, if an incoming telephone call is received, there is no way for the processor 102 to know how long the call may last—and therefore, the total runtime of the call—until the call is complete.

At step 304, the processor 102 may determine whether UTR is greater than X. If UTR is greater than X, initiation of playback of the first music track may subsequently occur at step 306. If UTR is less than or equal to X, initiation of playback of the second music track may subsequently occur at step 308. This process is described in more detail with respect to FIGS. 4 and 5, below.

Figure 4:
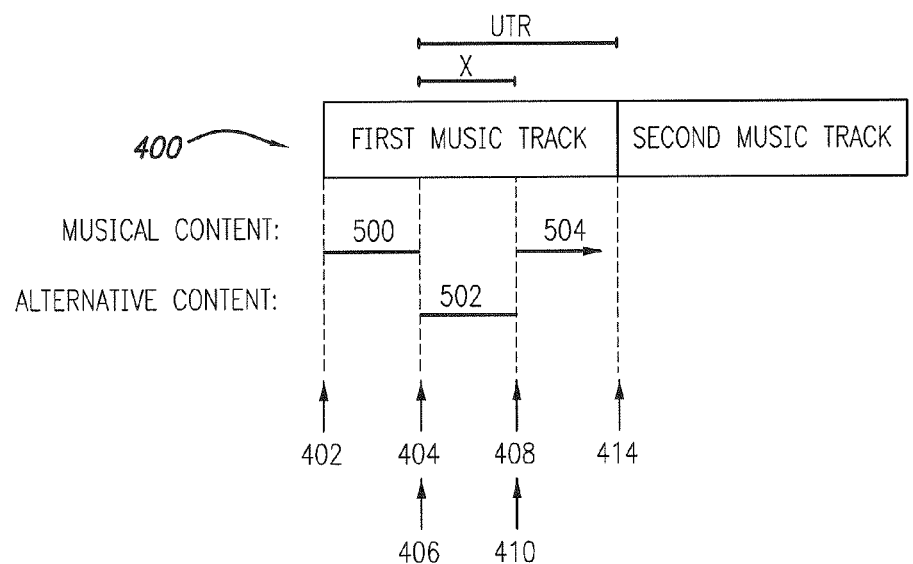
FIG. 4 is a diagram illustrating a music playback process according to an embodiment of the present invention.
Figure 5:
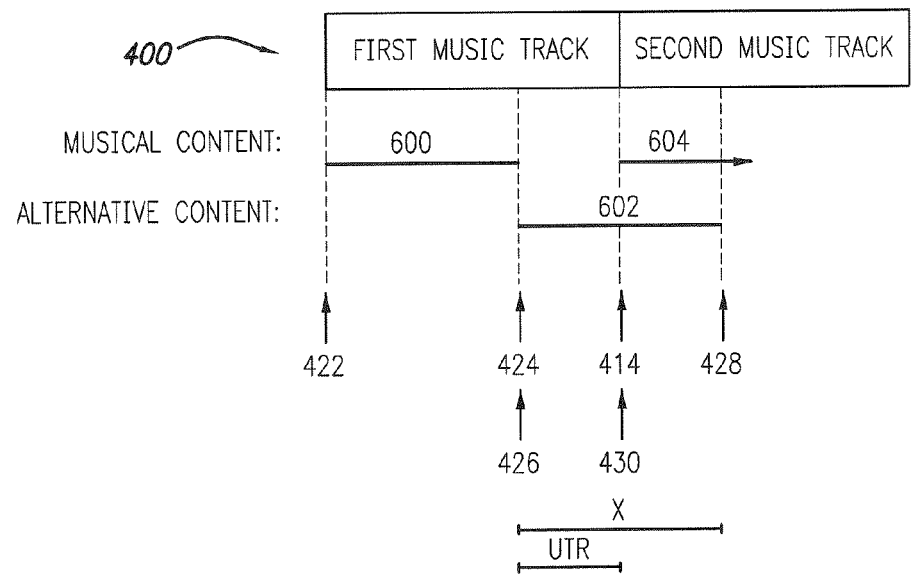
FIG. 5 is a diagram illustrating a music playback process according to an embodiment of the present invention.

FIGS. 4 and 5 are diagrams that illustrate the music playback processes where UTR is greater than X, and where UTR is less than or equal to X, respectively, according to embodiments of the present invention.

With reference to FIGS. 4 and 5, the music playback device 100 may be capable of playing multiple music tracks. In an embodiment, the music playback device 100 may consult a playlist 400, which may indicate a group of music tracks to be played and the order they should be played in. As described above, the music tracks and/or a playlist file corresponding to the playlist 400 may be saved in the memory 104 of the music playback device 100. Alternatively, the music tracks and/or the playlist file corresponding to the playlist 400 may be remotely accessible, as described in further detail below.

While exemplary embodiments of the present invention are often described with reference to a playlist 400, the present invention is not limited to the playback of music tracks associated with a playlist. In the case where a song order is not predetermined, (e.g. songs are played in a "shuffle" mode), the "first music track" may be the first piece of music that happens to be played, while the "second music track" may be the next piece of music that happens to be played after the first piece of music, without reference to a playlist.

The illustration of horizontal bars labeled "First Music Track" and "Second Music Track" in FIGS. 4 and 5 indicate that the first music track and the second music track are intended to be played in order according to the playlist 400. The length of the horizontal bars in the horizontal dimension corresponds to the total potential playback time of the first and second music tracks, respectively. The location of the transition point 414 between the first music track and the second music track is also illustrated. Segments 500, 504, 600, and 604 illustrate the playback of musical content, while segments 502 and 602 illustrate the playback of alternative content With reference now to FIG. 4, in one embodiment, as illustrated by segment 500, the processor 102 of the music playback device 100 may initiate the playback of a first music track at time 402, and playback of the first music track may be stopped at time 404.

Next, as illustrated by segment 502, the processor 102 of the music playback device 100 may initiate the playback of the alternative audio content at time 406, and playback of the alternative audio content may be stopped at time 408.

If the processor 102 determines that UTR is greater than X, then initiation of playback of the first music track (again) may subsequently occur at time 410, as illustrated by segment 504. Specifically, in one embodiment, playback of the first music track may be initiated from a point in the first music track that occurs after the point in the first music track at which playback of the first music track stopped (e.g. some time after playback of the first music track stopped at time 404). For example, as illustrated in FIG. 4, the point in the first music track that occurs after the point in the first music track at which playback of the first music track stopped (e.g. when playback of the first music track stopped at time 404) is a point in the first music track that occurs X quantity of time past the point at which playback of the first music track stopped (e.g. at time 410).

More specifically, for example, if the first music track is 4 minutes and 30 seconds long but stopping of playback of the first music track occurred 2 minutes and 30 seconds into the track, the UTR for the first track is 2 minutes. If the alternative audio content is initiated 2 minutes and 30 seconds into the track and lasts for 30 seconds, the X for the alternative audio content is 30 seconds. Because UTR is greater than X (i.e. 2 minutes is greater than 30 seconds), initiation of playback of the first music track may subsequently occur, in accordance with the embodiment of FIG. 4, at a point in the first music track that occurs X quantity of time past the point at which playback of the first music track stopped (i.e. 30 seconds past 2 minutes and 30 seconds into the track, or 3 minutes into the track).

Certain music playback devices 100 may provide separate audio channels for different audio sources. For example, a two audio channel music playback device 100 may provide a music audio channel and alternative audio content channel. Two audio channel devices may allow music audio data to be transmitted simultaneously with alternative audio content data. In an embodiment, such devices may allow a first music track to be muted while the alternative audio content is being played. Muting may consist of continuing to access and transmit data related to the first music track, but either not outputting it via a speaker or headphones or outputting it at a greatly reduced volume.

Other music playback devices may need to rely on only a single audio channel to handle, for example, separate music audio and alternative audio content signals. In these single channel devices, the music and alternative audio content signals may not be capable of being accessed and transmitted at the same time. As a result, these devices may not be capable of muting a first music track while the alternative audio content is being played, as described above with respect to a two-channel system.

In the embodiment of the present invention described above with respect to FIGS. 1-4, playback of the first music track may be resumed at the same point in time that it would have been resumed had the first music track been muted while the alternative audio content was being played. Such a process may be utilized by music playback devices 100 having either one or plural audio channels. Because the embodiment described above with reference to FIG. 4 need only utilize a single audio channel at a given time, such a music playback process may be desirable, for example, for a user 10 who would like to be able to effectively mute music while listening to alternative audio content, but whose music playback device 100 only offers a single audio channel.

With reference now to FIG. 5, in one embodiment, as illustrated by segment 600, the processor 102 of the music playback device 100 may initiate the playback of a first music track at time 422, and playback of the first music track may be stopped at time 424.

Next, as illustrated by segment 602, the processor 102 of the music playback device 100 may initiate the playback of the alternative audio content at time 426, and playback of the alternative audio content may be stopped at time 428.

If the processor 102 determines that UTR is less than or equal to X, then initiation of playback of the second music track may subsequently occur at time 430, as illustrated by segment 604. Specifically, in one embodiment, playback of the second music track may be initiated from the beginning of the second music track (i.e. the theoretical transition point 414 between the first music track and the second music track).

More specifically, for example, if the first music track is 4 minutes and 30 seconds long but stopping of playback of the first music track occurred 4 minutes into the track, the UTR for the first track is 30 seconds. If the alternative audio content is initiated 4 minutes into the track and lasts for 1 minute, the X for the alternative audio content is 1 minute. Because UTR is less than or equal to X (i.e. 30 seconds is less than 1 minute), initiation of playback of the second music track may subsequently occur, in accordance with the embodiment of FIG. 5, from the beginning of the second music track at time 430 (i.e. the theoretical transition point 414 between the first music track and the second music track).

In the above described embodiment, the second music track is not resumed at the same point in time that it would have been resumed had the music output been muted while the alternative audio content was being played. Specifically, if the music output had been muted while the alternative audio content was being played, the second music track would have been initiated at a point in the second music track that occurs X quantity of time past the point at which playback of the first music track stopped—in other words, the second music track would not have been initiated at its beginning. Such a music playback process may be desirable, for example, for a user 10 who would like to be able to mute music while listening to alternative audio content, but whose does not want to begin listening to a new music track in the middle of the new music track. In an embodiment, this process may be implemented in a music playback device 100 that only includes a single audio channel. In another embodiment, this process may be implemented in a music playback device 100 that includes more than one audio channel.

In one embodiment of the present invention, the music playback device 100 may be a portable music playback device 100. The portable music playback device 100 may be, for example, a portable digital audio file player (e.g. an MP3 player), a portable audio CD player, a portable audio tape player, a portable radio receiver (e.g. a terrestrial, satellite, or internet radio receiver), a portable vehicle audio system, a portable computer, a mobile phone, or any other portable device 100 capable of providing music playback to a user 10.

Figure 6:
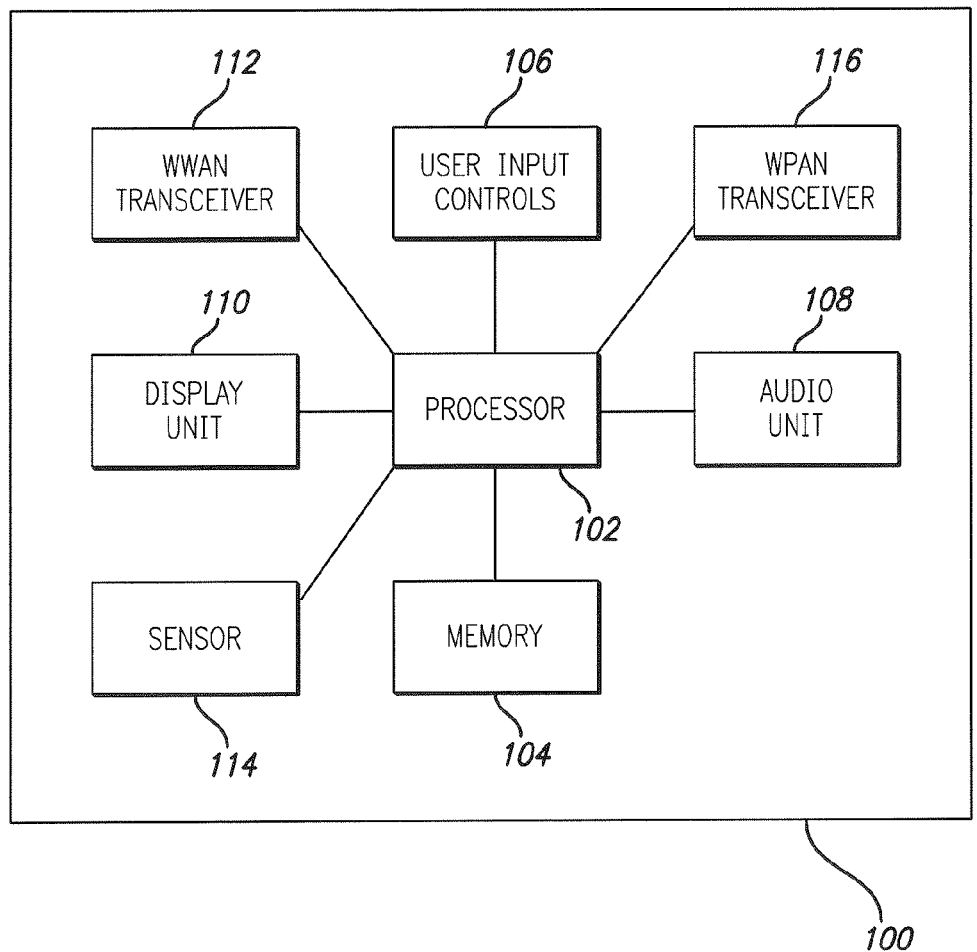
FIG. 6 is a block diagram of components of a portable music playing device according to an embodiment of the present invention.

FIG. 6 is a block diagram of components of a portable music playback device 100 according to an embodiment of the present invention. As shown in FIG. 6, the portable music playback device 100 may include a processor 102, a memory 104, user input controls 106, an audio unit 108, a display unit 110, a wireless wide area network (WWAN) transceiver 112, an integrated sensor 114, and a wireless personal area network (WPAN) transceiver 116. These components may be operatively connected to carry out the functionality of the portable music playback device 100, as is described in further detail above and below. In some embodiments, one or more of these components may be omitted, or additional components may be included. In an embodiment, music playback device 100 may include a battery. In one embodiment, a speaker and/or an audio output port may also be included. In another embodiment, the speaker and/or the audio output port may be part of the audio unit 108.

The processor 102, memory 104, user input controls 106, and audio unit 108 of the embodiment illustrated in FIG. 6 may serve similar functions to those discussed above with respect to FIG. 1.

The display unit 110 may be used to visually display information to the user 10. In one embodiment, the display unit 110 may be a liquid crystal display. In another embodiment, a single display screen may include aspects of both the display unit 110 and the user input controls 106 in the form of touch screen input controls. In an embodiment, as illustrated in FIG. 6, the display unit 110 may be integrally coupled to and included within the same housing as the portable music playback device 100. However, in another embodiment, as described in further detail below, some or all of the display unit 110 may not be integrally coupled to and/or included within the same housing as the portable music playback device 100 itself.

The portable music playback device 100 may also include an integrated sensor 114. In one embodiment, the integrated sensor 114 may be a satellite-based positioning system receiver, such as a GPS receiver. The positioning system receiver may function as a sensor 114 integrally coupled to the portable music playback device 100, and may allow the portable music playback device 100 to detect information that may be used to measure and/or calculate location, distance traveled, pace, and/or speed. In another embodiment, the integrated sensor 114 may be an accelerometer that may be used to measure and/or calculate distance traveled, pace, and/or speed.

The WPAN transceiver 116 may be capable of wireless communication with components remotely located from the portable music playback device 100 that are supported by and/or in proximity to the user's 10 body. In one embodiment, the WPAN transceiver 116 is a low-power transceiver. The WPAN transceiver 116 may include an antenna, and may operate in an unlicensed frequency band, such as 2.4 GHz. The WPAN transceiver may communicate using known wireless protocols, including, but not limited to, ANT and ANT+, by Dynastream Innovations, Bluetooth, Bluetooth LE, Bluetooth LET, or BlueRobin. Other known wireless communication protocols may be used. In one embodiment, the WPAN transceiver may be an infrared transceiver.

In one embodiment, the WPAN transceiver 116 may communicate with sensors that are supported by the user's 10 body such as, for example, a heart rate monitor 30 or an accelerometer-based sensor 40, as described in further detail below. In another embodiment, the WPAN transceiver 116 may communicate with a wristband 50 or a speaker or headphones 20 that are supported by the user's 10 body, which are also described in further detail below.

The WWAN transceiver 112 may be a cellular transceiver that may be used to send and receive, for example, voice cellular telephone signals. The WWAN transceiver 112 may also be used to exchange information with a computer network such as, for example, the Internet or an intranet. The WWAN transceiver 112 may include an antenna.

In embodiments of the present invention where the portable music playback device 100 includes a WWAN transceiver 112, the user 10 may be able to receive music tracks via download or live streaming for playback by the portable music playback device 100. Furthermore, the user 10 may be able to receive alternative audio content via download or live streaming for playback by the portable music playback device 100. The music playback processes described above with reference to FIGS. 2-5 may advantageously be utilized to manage the receipt and playback of such information.

As described above, the alternative audio content may be, for example, a voice recording that had previously been saved as an audio track. Via the WWAN transceiver 112, a user 10 listening to music on the portable music playback device 100 may be able to receive a remotely transmitted pre-recorded audio message from a friend, relative, or colleague, a pre-recorded audio news or information, a pre-recorded audio advertisement, pre-recorded audio point-of-interest information, and/or pre-recorded substantially real-time audio feedback, as described in further detail below.

As also described above, the alternative audio content may be, for example, or a substantially real-time remotely transmitted voice transmission (e.g. a telephone call). Via the WWAN 112 or WPAN 116 transceiver, a user 10 listening to music on the portable music playback device 100 may be able to receive a remotely transmitted telephone call from a friend, relative, or colleague (e.g. if the portable music playback device 100 is a mobile phone), substantially real-time audio news or information, substantially real-time point-of-interest information, and/or a substantially real-time audio feedback, as described in further detail below.

In embodiments of the present invention where the portable music playback device 100 includes a WPAN transceiver 116, the portable music playback device 100 may communicate with one or more of headphones 20, a heart rate monitor 30, and accelerometer-based sensor 40, and/or a wristband 50.

Figure 7:
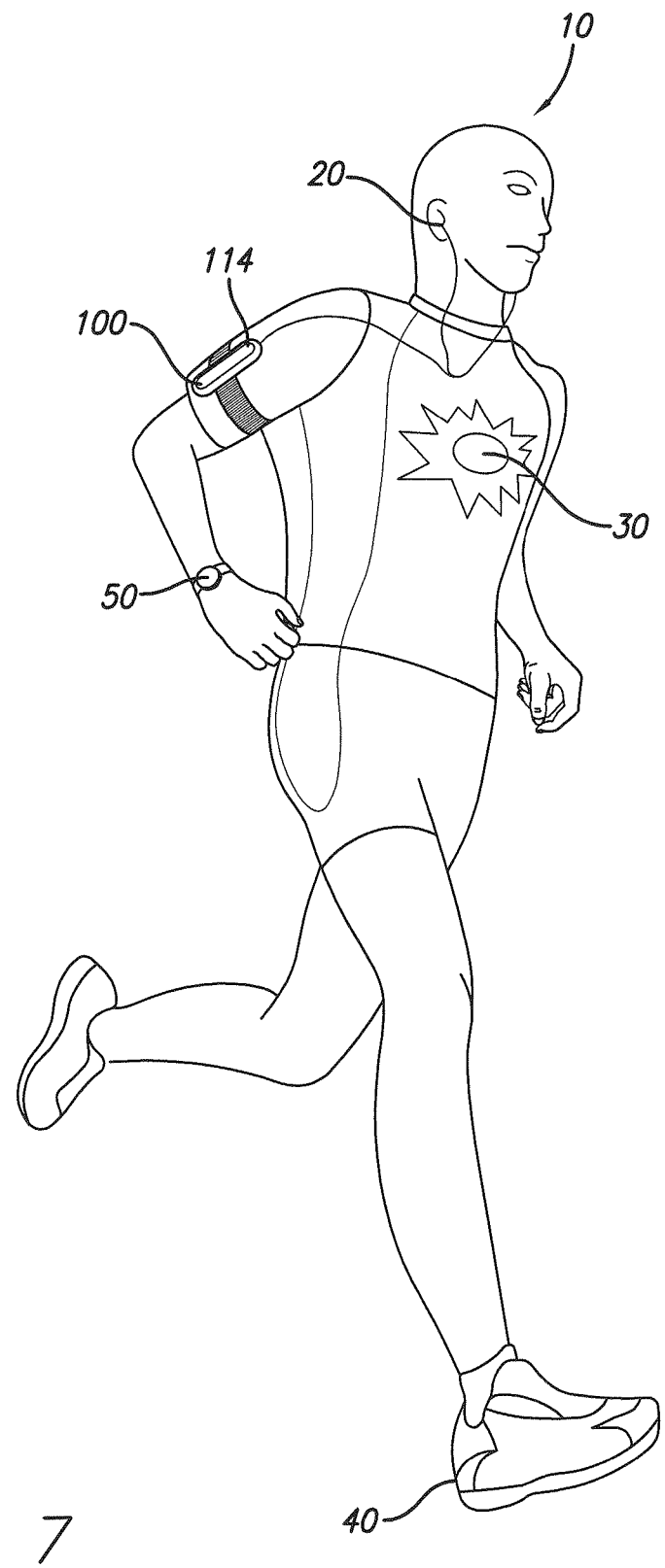
FIG. 7 is an illustration of a user engaged in an activity according to an embodiment of the present invention.

FIG. 7 is an illustration of a user 10 engaged in an athletic activity according to an embodiment of the present invention. The user's 10 body is supporting headphones 20, a heart rate monitor 30, and accelerometer-based sensor 40, and a wristband 50. In an embodiment, the portable music playback device 100 and the music playback processes described herein may be used in conjunction with a portable fitness monitoring system such as, for example, those disclosed in commonly owned U.S. patent application Ser. No. 12/536,421, titled "Fitness Monitoring Methods, Systems, and Program Products, and Applications Thereof," and U.S. patent application Ser. No. 12/836,416, titled "Location-Aware Fitness Monitoring Methods, Systems, and Program Products, and Applications Thereof," filed on the same day herewith, each of which have previously been incorporated herein by reference in their entireties.

For example, the user 10 may engage in an activity that was previously planned and scheduled using a portable fitness monitoring system, while utilizing the portable music playback device 100 and one or more of the integrated sensor 114, the heart rate monitor 30, and/or the accelerometer-based sensor 40. During the activity, the portable music playback device 100 may communicate with one or more of these sensors and may determine various performance parameters associated with the user's 10 physical activity (e.g. location, distance traveled, speed, pace, heart rate, etc.). Still during the activity, the portable music playback device 100 may provide alternative audio content to the user 10 in the form of feedback related to the performance parameters.

For example, the portable music playback device 100 may provide alternative audio content that conveys to the user 10 summary statistics (e.g. "You have traveled 2 miles, your speed is 7.5 miles per hour, your pace is 8 minutes per mile, and your heart rate is 160 beats per minute") or conveys actual instructions or coaching (e.g. "Your target speed is 8 miles per hour, but you are only traveling 7.5 miles per hour—speed up!" or "Your target pace is 7 minutes per mile, but you are only maintaining a pace of 8 minutes per mile—speed up!" or "Your target heart rate is between 140 and 150 beats per minute, but your current heart rate is 160 beats per minute—slow down!"). The music playback processes described above with reference to FIGS. 2-5 may advantageously be utilized to manage the receipt and playback of such information.

This fitness activity-related alternative audio content may be artificial speech generated by a speech synthesizer, a voice recording that had previously been saved as an audio track, or a substantially real-time remotely transmitted voice transmission (e.g. a telephone call), as described above. The alternative audio content may be stored locally on the portable music playback device 100 or may be stored remotely and received via the WWAN 112 or WPAN 116 transceiver.

Thus, embodiments of the present invention may provide improved methods, systems, and program products for controlling the playback of music, and optionally the playback of fitness activity-related alternative audio content, that may allow for an improved user 10 experience with music playback devices 100.

In one embodiment, with reference to step 208 of FIG. 2, the determination of whether to next initiate the playback of the first music track (again) or to initiate the playback of a second music track may be made in whole or in part based on various performance parameters associated with the user's 10 physical activity (e.g. location, distance traveled, speed, pace, heart rate, etc.). In another embodiment, the point in the music track at which playback may be initiated may be calculated based on various performance parameters associated with the user's 10 physical activity (e.g. location, distance traveled, speed, pace, heart rate, etc.).

Various aspects of the present invention, or any parts or functions thereof, may be implemented using hardware, software, firmware, tangible computer readable or computer usable storage media having instructions stored thereon, or a combination thereof and may be implemented in one or more computer systems or other processing systems.

Methods, systems, and program products for controlling the playback of music according to embodiment of the present invention may include any software application executed by one or more computing devices. A computing device may be any type of computing device having one or more processors. For example, a computing device may be a workstation, mobile device (e.g., a mobile phone, personal digital assistant, or laptop), computer, server, compute cluster, server farm, game console, set-top box, kiosk, embedded system, a gym machine, a retail system or other device having at least one processor and permanent or removable memory. Embodiments of the present invention may be software executed by a processor, firmware, hardware or any combination thereof in a computing device.

Software of the present invention may be stored on any computer-usable medium. Such software, when executed in one or more data processing device, may cause the data processing device to operate as described herein. Embodiments of the invention employ any computer-usable or -readable medium, known now or in the future. Examples of computer-usable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage devices, memory cards or other removable storage devices, etc.), and communication mediums (e.g., wired and wireless communications networks, local area networks, wide area networks, intranets, etc.).

While exemplary embodiments of the present invention are often described with reference to a playlist 400, the present invention is not limited to the playback of music tracks associated with a playlist.

Furthermore, while exemplary embodiments of the present invention are often described with reference to music playback device 100 having a single audio channel, the present invention is not so limited.

Finally, while the primary content listened to by the user 10 has been described as being "musical content" and the secondary content listened to by the user 10 has been described as "alternative content," the principles of operation of the described methods, systems, and program products apply equally to embodiments where the primary content listened to by the user 10 is alternative content, and the secondary content listened to by the user 10 is musical content. Likewise, the principles of operation of the described methods, systems, and program products apply equally to embodiments where both the primary and secondary content are musical content, or embodiments where both the primary and secondary content are alternative (e.g. non-musical) content. Accordingly, such embodiments are also within the scope of the present invention.

The present invention has been described above by way of exemplary embodiments. Accordingly, the present invention should not be limited by any of the above-described exemplary embodiments, but should be defined only in accordance with the following claims and their equivalences.

What is claimed is:

1. A method for controlling the playback of music comprising the steps of:
    (a) initiating the playback of a first music track;
    (b) stopping the playback of the first music track after step (a);
    (c) initiating the playback of alternative audio content after step (b);
    (d) stopping the playback of the alternative audio content after step (c); and
    (e) determining whether to initiate the playback of the first music track or to initiate the playback of a second music track after step (d) based on a quantity of unplayed time remaining for the first music track.

2. The method of claim 1, wherein the step (e) further comprises the steps of:
   determining the quantity of unplayed time remaining for the first track; and
   determining X, wherein X is equal to the quantity of time of the alternative audio content.

3. The method of claim 2, wherein step (e) further comprises the step of determining that the quantity of unplayed time remaining for the first track is greater than X.

4. The method of claim 3, further comprising the step of:
   (f) initiating the playback of the first music track in response to step (e).

5. The method of claim 4, wherein step (f) comprises initiating the playback of the first music track from a point in the first music track that occurs after the point in the first music track at which playback of the first music track stopped.

6. The method of claim 5, wherein the point in the first music track that occurs after the point in the first music track at which playback of the first music track stopped is a point in the first music track that occurs X quantity of time past the point at which playback of the first music track stopped.

7. The method of claim 2, wherein step (e) further comprises the step of determining that the quantity of unplayed time remaining for the first track is less than or equal to X.

8. The method of claim 7, further comprising the step of:
   (f) initiating the playback of the second music track in response to step (e).

9. The method of claim 8, wherein step (f) comprises initiating the playback of the second music track from the beginning of the second music track.

10. The method of claim 8, wherein the identity of the second music track is determined by reference to a playlist.

11. The method of claim 1, wherein the first music track, second music track, and alternative audio content are played back by a portable device.

12. The method of claim 11, wherein the first music track and the second music track are stored on the portable device.

13. The method of claim 11, wherein the alternative audio content is a voice recording audio track that is stored on the portable device.

14. The method of claim 11, wherein the alternative audio content is generated by a speech synthesizer of the portable device.

15. The method of claim 11, wherein the alternative audio content is wirelessly received by the portable device.

16. The method of claim 15, wherein the alternative audio is a telephone call transmission.

17. The method of claim 11, wherein the portable device is being supported by a user engaged in an athletic activity during the playback.

18. The method of claim 17, wherein the alternative audio content conveys information related to the user's speed during the activity.

19. The method of claim 17, wherein the alternative audio content conveys information related to the user's pace during the activity.

20. The method of claim 17, wherein the alternative audio content conveys information related to the user's heart rate during the activity.

21. A system for controlling the playback of music, comprising:
   a portable device adapted for the playback of music, wherein the portable device comprises:
      a memory capable of storing a first music track, a second music track, and alternative audio content; and
      a processor capable of being operable to:
         initiate the playback of the first music track at a first time;
         stop the playback of the first music track at a second time after the first time;
         initiate the playback of the alternative audio content at the second time;
         stop the playback of the alternative content at a third time after the second time; and
         determine whether to initiate the playback of the first music track or to initiate the playback of the second music track at the third time.

22. The system of claim 21, wherein the portable device further comprises:
   a sensor adapted to detect performance data while a user engages in an athletic activity,
   wherein the alternative audio content is capable of conveying information related to the performance data.

23. The system of claim 22, wherein the processor, the memory, and the sensor are included in a common housing of the portable device.

24. The system of claim 22, wherein the sensor is a satellite positioning system receiver.

25. The system of claim 24, wherein the information related to the performance data is speed information.

26. The system of claim 24, wherein the information related to the performance data is pace information.

27. The system of claim 22, wherein the sensor is an accelerometer.

28. The system of claim 27, wherein the information related to the performance data is speed information.

29. The system of claim 27, wherein the information related to the performance data is pace information.

30. The system of claim 21 further comprising:
   a sensor adapted to detect performance data while a user engages in an athletic activity,
   wherein the portable device further comprises a wireless transceiver for wirelessly receiving the performance data from the sensor, and
   wherein the alternative audio content is capable of conveying information related to the performance data.

31. The system of claim 30, wherein the processor, the memory, and the wireless transceiver are included in a first housing of the portable device, and wherein the sensor is included in a second housing remotely located from the first housing of the portable device.

32. The system of claim 30, wherein the sensor includes an accelerometer.

33. The system of claim 32, wherein the information related to the performance data is speed information.

34. The system of claim 32, wherein the information related to the performance data is pace information.

35. The system of claim 30, wherein the sensor is a heart rate monitor and wherein the information related to the performance data is heart rate information.

36. A method for controlling the playback of music comprising the steps of:
   (a) initiating the playback of a first music track;
   (b) stopping the playback of the first music track after step (a);
   (c) initiating the playback of alternative audio content after step (b);
   (d) stopping the playback of the alternative audio content after step (c); and
   (e) determining whether to initiate the playback of the first music track or to initiate the playback of a second music track after step (d), wherein step (e) further comprises:
  determining a quantity of unplayed time remaining for the first track; and
  determining X, wherein X is equal to a quantity of time of the alternative audio content.

37. A method for controlling the playback of music in an athletic performance monitoring system, comprising the steps of:
  (a) initiating the playback of a first music track;
  (b) stopping the playback of the first music track after step (a);
  (c) initiating the playback of athletic performance feedback after step (b);
  (d) stopping the playback of athletic performance feedback after step (c); and
  (e) determining whether to initiate the playback of the first music track or to initiate the playback of a second music track after step (d) based on the quantity of unplayed time remaining for the first music track.

38. The method of claim 1, wherein the alternative audio content comprises non-music audio content.

\* \* \* \* \*